United States Patent
Rebholz et al.

(10) Patent No.: US 12,240,320 B2
(45) Date of Patent: Mar. 4, 2025

(54) METHOD FOR CONTROLLING A DRIVING DYNAMICS FUNCTION OF A WORKING MACHINE

(71) Applicant: ZF Friedrichshafen AG, Friedrichshafen (DE)

(72) Inventors: Wolfgang Rebholz, Sauldorf-Boll (DE); Matthias Längle, Pfullendorf (DE); Joachim Sauter, Berg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 392 days.

(21) Appl. No.: 17/442,725

(22) PCT Filed: Mar. 18, 2020

(86) PCT No.: PCT/EP2020/057425
§ 371 (c)(1),
(2) Date: Sep. 24, 2021

(87) PCT Pub. No.: WO2020/193308
PCT Pub. Date: Oct. 1, 2020

(65) Prior Publication Data
US 2022/0185108 A1     Jun. 16, 2022

(30) Foreign Application Priority Data

Mar. 26, 2019 (DE) .................. 10 2019 204 129.9

(51) Int. Cl.
*B60K 17/35* (2006.01)
*B60K 17/16* (2006.01)
*B60K 17/36* (2006.01)

(52) U.S. Cl.
CPC ........ *B60K 17/3505* (2013.01); *B60K 17/165* (2013.01); *B60K 17/36* (2013.01)

(58) Field of Classification Search
CPC .. B60K 17/3505; B60K 17/165; B60K 17/36; B60W 2520/26; B60W 2520/263;
(Continued)

(56) References Cited

U.S. PATENT DOCUMENTS 4,467,886 A * 8/1984 DeClaire ................ B60K 23/04
                                                    180/197
4,860,208 A * 8/1989 Bantle .................... B60T 8/1769
                                                     701/69

(Continued)

FOREIGN PATENT DOCUMENTS

DE    10 2005 047 095 A1    4/2007
DE    10 2017 204 354 A1    9/2018
(Continued)

OTHER PUBLICATIONS

German Office Action Corresponding to 10 2019 204 129.9 mailed Mar. 11, 2021.
(Continued)

*Primary Examiner* — Bhavesh V Amin
(74) *Attorney, Agent, or Firm* — Finch & Maloney PLLC

(57) ABSTRACT

A method for controlling a driving dynamics function of a working machine with at least two vehicle axles. A current actual wheel rotational speed of at least one wheel is detected and sent to a control unit for comparison with an acceptable wheel rotational speed of the same wheel and wheel slip is calculated from that comparison. The control unit emits a control signal to lock at least one differential gear system if the wheel slip has an unacceptable value. For the differential gear system (4, 5, 6, 7, 8) concerned, an unlocking control signal is periodically emitted and the wheel rotational speeds are compared afresh. A control signal to lock the differential gear system concerned is emitted again if the value of the wheel slip is still unacceptable, and a trajectory is detected with reference to detection (Continued)

elements, along which the value of the wheel slip of the at least one wheel has been unacceptable.

10 Claims, 3 Drawing Sheets

(58) Field of Classification Search
CPC .......... B60W 2520/28; B60W 2754/10; B60Y 2200/1422
See application file for complete search history.

(56) References Cited

U.S. PATENT DOCUMENTS

| | | | | |
|---|---|---|---|---|
| 5,333,108 A * | 7/1994 | Hessmert | ................ | B60T 8/173 701/84 |
| 5,574,643 A * | 11/1996 | Yesel | .................... | B60W 10/12 192/3.3 |
| 5,927,422 A * | 7/1999 | Schakel | ................ | B60T 8/1708 180/338 |
| 6,038,506 A * | 3/2000 | Diekhans | ............... | B60K 23/04 701/88 |
| 6,085,138 A * | 7/2000 | Smith | .................... | B60K 23/08 172/3 |
| 7,766,104 B2 * | 8/2010 | Newberry | ............. | E02F 9/2045 180/24.09 |
| 7,770,681 B2 * | 8/2010 | Marathe | ............... | B60K 28/165 180/197 |
| 7,810,601 B2 * | 10/2010 | Hamrin | ................ | B60K 28/165 701/69 |
| 7,856,303 B2 * | 12/2010 | Thompson | ............. | B60K 23/04 701/50 |
| 7,894,958 B2 * | 2/2011 | Tate | ........................ | B60T 8/175 701/44 |
| 8,226,177 B2 * | 7/2012 | Sjogren | .................. | B60T 8/175 180/197 |
| 8,312,956 B2 * | 11/2012 | Rindfleisch | .......... | B60K 28/165 180/338 |
| 8,626,404 B2 * | 1/2014 | Thomson | .................. | E02F 3/84 701/84 |
| 9,132,730 B2 * | 9/2015 | Hoeck | .................... | B60K 23/04 |
| 9,382,992 B2 * | 7/2016 | Vanderpool | ............ | B60K 23/04 |
| 9,605,740 B2 * | 3/2017 | Povirk | .................. | B60K 17/344 |
| 10,487,931 B2 * | 11/2019 | Mair | ....................... | F16H 48/24 |
| 2001/0027144 A1 * | 10/2001 | Murakami | ........... | B60K 28/165 475/86 |
| 2006/0154776 A1 * | 7/2006 | Claussen | ............ | B60K 17/3462 475/231 |
| 2006/0154787 A1 * | 7/2006 | Claussen | ................ | B60K 17/36 477/175 |
| 2007/0179699 A1 * | 8/2007 | Kinsey | .................. | B60T 8/1755 180/197 |
| 2008/0221771 A1 * | 9/2008 | Olsson | ..................... | B60K 6/12 701/88 |
| 2008/0255735 A1 * | 10/2008 | Marathe | ................ | E02F 9/2037 701/88 |
| 2011/0052016 A1 * | 3/2011 | Nishii | .................... | G16H 40/20 382/128 |
| 2018/0236937 A1 * | 8/2018 | Utter | ....................... | G01S 19/53 |
| 2018/0274645 A1 * | 9/2018 | Mair | ....................... | F16H 48/24 |

FOREIGN PATENT DOCUMENTS

| | | |
|---|---|---|
| EP | 2045112 A1 | 4/2009 |
| EP | 2 949 507 A1 | 12/2015 |
| KR | 2006-0081359 A | 7/2006 |
| WO | 2018/166680 A1 | 9/2018 |

OTHER PUBLICATIONS

International Search Report Corresponding to PCT/EP2020/057425 mailed Jun. 17, 2020.
Written Opinion Corresponding to PCT/EP2020/057425 mailed Jun. 17, 2020.
Chinese Office Action corresponding to 202080022627.0 mailed Mar. 19, 2024.
Chinese Office Action Corresponding to 202080022627.0 issued Dec. 5, 2024.

* cited by examiner

METHOD FOR CONTROLLING A DRIVING DYNAMICS FUNCTION OF A WORKING MACHINE

This application is a National Stage completion of PCT/EP2020/057425 filed Mar. 18, 2020, which claims priority to German patent application serial no. 10 2019 204 129.9 filed Mar. 26, 2019.

FIELD OF THE INVENTION

The present invention relates to a method for controlling a driving dynamics function of a working machine. In this context a working machine describes a vehicle with equipment for carrying out work, wherein the equipment can be connected permanently on, or detachably from the working machine. In particular, working machines are understood to be agricultural and/or building machines. In particular but not exclusively, a working machine can be a multi-axle dump truck, for example a so-termed dumper.

BACKGROUND OF THE INVENTION

Working machines can have a driven front axle and a driven rear axle, in each case with a transverse differential gear system for rotational speed equalization between the two wheels on an axle. Between the front and rear axles a longitudinal differential gear system for rotational speed equalization between the two axles can be provided. The individual wheels of the working machine can have a rotational speed sensor, by way of which it can be determined whether a wheel is slipping. If slipping of at least one wheel is taking place, it can be necessary to lock one or more of the differential gears.

For example, from EP 2 949 507 A1 a vehicle and a method for controlling a vehicle are known, such that the vehicle has an unloading mechanism. In addition the vehicle comprises a control system designed to actuate a brake device and lock an intermediate differential if the control system detects a command to unload material and the transmission is in a neutral position.

SUMMARY OF THE INVENTION

The purpose of the present invention is to provide an improved method for controlling a driving dynamics function of a working machine. Furthermore, the present invention relates to a working machine with a control unit that carries out the method according to the invention. In addition, the invention relates to a computer program product for carrying our the method.

According to the invention, this objective is achieved by the method, the working machine and the computer program product according to the claims. According to these, the method is designed to control a driving dynamics function of a working machine having at least two vehicle axles. In particular, the two vehicle axles are, respectively, a front axle and a rear axle. However, vehicle arrangements with more than two vehicle axles, in particular one front axle and two or more rear axles, are also conceivable. Wheels are fitted on the vehicle axles. According to the method, a current actual wheel rotational speed of at least one wheel is detected and a control unit carries out a comparison with an acceptable wheel rotational speed of the same wheel. From the current, actual wheel rotational speed and the acceptable vehicle wheel rotational speed for the driving situation concerned, wheel slip is calculated.

From the control unit a signal to lock at least one differential gear system is emitted if the value of the wheel slip is unacceptable. For the locked gear system concerned, an unlocking control signal is emitted periodically, and a fresh comparison of the wheel rotational speeds is carried out. So long as the wheel slip value of the wheel concerned is still unacceptable, a control signal to lock the differential gear system concerned is emitted again.

In the context mentioned above, a current wheel rotational speed is understood to mean an actually existing wheel rotational speed. The control unit can be an electric control unit. As an example but not exclusively, this can be a vehicle control unit (such as a vehicle management computer), an engine control unit, a transmission control unit, a control unit for driving dynamics functions, or a control unit suitable in some other way.

In this context an acceptable rotational speed of a wheel describes a rotational speed which is to be expected having regard to other driving dynamics parameters of the working machine. In particular, this includes a wheel rotational speed which, ideally at a current engine rotational speed and having regard to various gear ratios of the transmissions and under ideal conditions (for example with no slip), should exist at the wheel concerned. The driving situation too, in particular driving round a curve or with the steering angle at the time, have an influence on the wheel rotational speed. In relation to the acceptable wheel rotational speed it is also possible to specify a tolerance range for exceeding or falling below an acceptable wheel rotational speed. Correspondingly, an unacceptable value of the wheel rotational speed is understood to be a value which either differs from the acceptable wheel rotational speed or is outside the tolerance range concerned.

In this connection a differential gear system describes an equalization gear system which can in particular compensate different rotational speeds between two shafts. Here, a distinction is made essentially between a so-termed transverse differential and a longitudinal differential. Transverse differentials enable equalization between the wheels on an axle, particularly when driving round a curve. On the other hand, by virtue of longitudinal differentials an equalization between different vehicle axles can take place. In the context of differentials, the locking of such a differential is understood to mean that the previously described compensation movement or rotational speed equalization is reduced or completely locked. Thus, with a completely locked differential gear system the two axles rotate at the same speed. Analogously, unlocking of a differential means that either a completely locked differential gear system is at least partially opened or it is opened to the full extent, whereby the compensation movement or rotational speed equalization takes place partially or completely.

The periodic emission of a control signal to unlock a locked differential is understood to mean that repeated such control signals are emitted, in particular at equal time intervals. In this, a corresponding period length can depend on various influencing factors and can therefore vary.

According to the invention, by means of detection means a trajectory is determined, along which the wheel slip of the at least one wheel has had an unacceptable value. The detection means can for example be rotational speed sensors of the wheels (on the wheels, or on the axle concerned), which are associated with an acceptable wheel rotational speed or an acceptable wheel slip. Furthermore, the detection means can comprise at least one GPS sensor which receives a position signal and transmits it to the control unit. Alternatively or in addition, the detection means can also include one or more acceleration sensors, distance sensors or laser sensors. In particular the detection means may also be designed in the form of optical sensors for speed determination, and in that case these are advantageously directed toward the trajectory traveled or the ground under the working machine. Correspondingly, the trajectory traveled is a driving distance or a length of track which has been covered. Thus, according to the invention a trajectory is detected which owing to its condition led to an unacceptable value of the wheel slip. In particular an unacceptable wheel slip value can be caused by reduced traction, which can be the result of the condition of the ground. Thus, environmental influences in particular can reduce the traction along a certain trajectory. In this connection various ground or subsoil conditions should be taken into account, such as snow, ice, precipitations (and especially mud formation caused thereby).

In an advantageous further development of the method according to the invention, besides a trajectory covered, its position is also determined so that, in a predictive manner, before a further wheel proceeds onto the trajectory concerned, a locking control signal for at least one further differential gear system is emitted.

In the present case, GPS data can be used to determine the position. Alternatively, information relating to an axial distance can be used to determine, for example, when a wheel of a second vehicle axle is driving through an area with reduced traction, when it was identified by an unacceptable wheel slip of a wheel on a first vehicle axle. The at least one further differential gear system can in particular be a transverse differential gear system of a second and/or a third vehicle axle. Alternatively, a longitudinal differential gear system can also be understood to be included. The expression 'predictive' in this connection is thus to be understood in the sense that proactively, i.e. before the actual occurrence of a possible traction decrease, locking of a further differential gear system is already initiated. In that way the driving dynamics of the working machine can be further improved.

Also advantageously, for the at least one further differential gear system an unlocking control signal is emitted periodically and a fresh comparison of the wheel rotational speeds is carried out. Then, a control signal to lock the differential gear system concerned is again emitted if the wheel slip or wheel rotational speed of the wheel concerned still has an unacceptable value.

According to an advantageous further development of the method according to the invention, a value of a closing duration of the at least one locked differential gear system that results from a period length is adapted, having regard to further driving dynamics parameters. In particular, the driving dynamics parameters can include information about a curved trajectory of the working machine. For better maneuverability, it may therefore be necessary, when driving round a curve, to unlock a locked differential gear system at least partially. Moreover, information can also be included which represents an accumulation of trajectories with reduced traction or unacceptable wheel slip values. Correspondingly, for the purpose of minimizing wear the closing duration or the corresponding period length can be increased if, over a longer time or several periods, a (continuous) trajectory with reduced traction has been recognized. On the other hand, a period length can be made shorter if only very short trajectories with reduced traction or unacceptable wheel slip have been identified.

Advantageously, as a priority for the differential gear system concerned an unlocking control signal is emitted and the wheel slip determined afresh if, when the differential is unlocked, there is a high probability that an acceptable wheel slip value is to be expected. So long as here too the value of the wheel slip is still unacceptable, a control signal to lock the differential gear system concerned is emitted again. In other words a prioritization or weighting can be applied, concerning which wheel is likely to be the next to move through an area with high traction again. For that, in particular information about the length of the trajectory and the position of the respective trajectories with low and high traction is helpful.

So long as the value of the wheel slip at the differential gear system locked as a priority remains unacceptable, the periodic emission of the control signal to unlock the remaining differential gear system is advantageously deferred. In other words the period length for the emission of the control signal to unlock the remaining differential gear system is increased.

Advantageously, a wheel rotational speed of at least one further wheel is used by the detection means. Ideally, this is an acceptable wheel rotational speed value. Furthermore, however, wheel rotational speed values of several wheels can be used. In that way the plausibility of the rotational speed values of various wheels can also be checked.

In another advantageous further development of the method according to the invention, a signal for the determination of position data is also used by the detection means.

According to a further aspect of the present invention, the invention covers a working machine which comprises a drive-train with a drive element, at least one differential gear system that can be locked, at least two vehicle axles and at least one wheel fitted on each axle. In addition the working machine comprises detection means as described earlier and a control unit which is designed to carry out the method according to the invention. Ideally each vehicle axle has two wheels, one on the left-hand side of the vehicle and one on the right. Arrangements with so-termed twin tires or with a double axle are also conceivable.

In addition the present invention includes a computer program product with a program code for carrying out the method when the program code is run on a computer. The computer can for example be the control unit itself. Alternatively it is also conceivable that the computer is arranged decentralized from the working machine. In particular this is understood to mean that the control unit of the working machine and the computer interact for example by way of a wireless connection and exchange data with one another. Correspondingly, the locking or unlocking signals could be sent by the computer to the control unit of the working machine.

BRIEF DESCRIPTION OF THE DRAWINGS

The invention will be described in greater detail with reference to the following figures, which show.

DETAILED DESCRIPTION OF THE PREFERRED EMBODIMENTS

Figure 1:
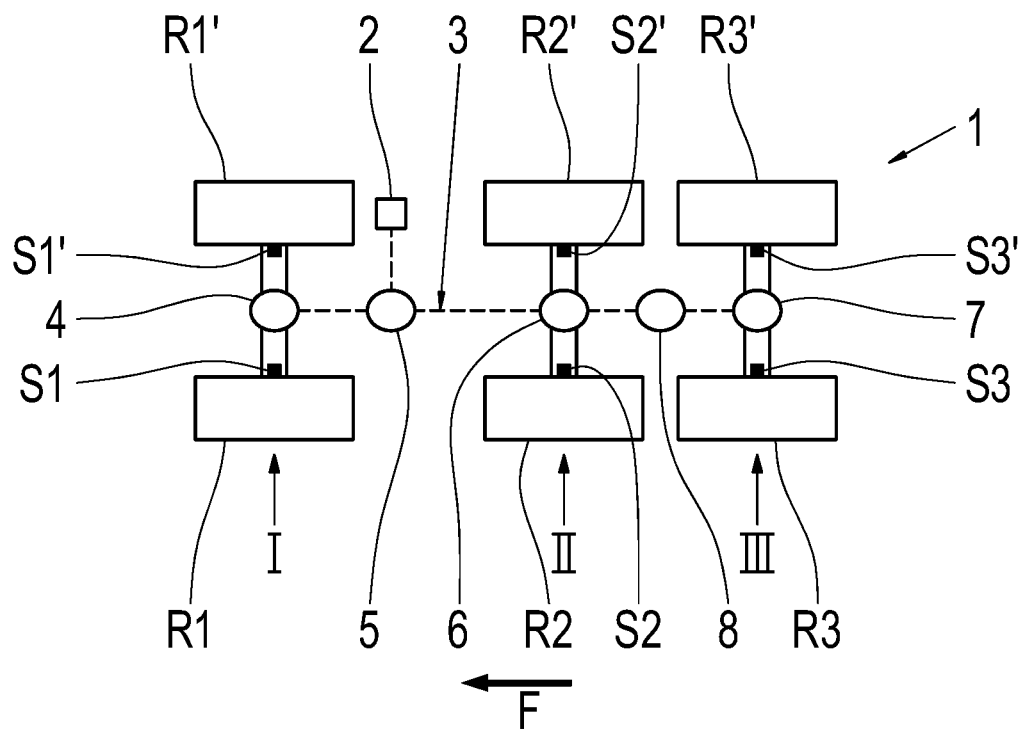
FIG. 1: A schematic representation of a first drive-train of a working machine.

FIG. 1 shows in greatly simplified and schematic form a drive-train 1 of a working machine. In this case the drive-train 1 comprises first, second and third vehicle axles I, II, III, wherein the first axle I is designed to be a front axle and the second and third axles II and III are rear axles. Arranged on the first vehicle axle there are two wheels R1, R1', on the second vehicle axle II there are two wheels R2, R2' and on the third vehicle axle III there are again two wheels R3, R3'. In addition, two detection means S1, S1' are associated with the first vehicle axle I, two detection means S2, S2' with the second vehicle axle II, and two detection means S3, S3' likewise with the third vehicle axle III. In this case the detection means S1, S1', S2, S2', S3, S3' are rotational speed sensors.

In addition the first vehicle axle I has a differential gear system 4, the second vehicle axle II a differential gear system 6 and the third vehicle axle III a differential gear system 7. The differential gear systems 4, 6, 7 are in this case in the form of transverse differential gear systems. Thus, they enable rotational speed equalization between the wheels R1, R1', R2, R2' and R3, R3'; of the respective vehicle axles I, II, III.

Furthermore, between the first and second vehicle axles I, II a differential gear system 5 is arranged and between the second and third vehicle axles II, III a differential gear system 8 is arranged. The two differential gear systems 5, 8 are in this case in the form of longitudinal differential gear systems and enable rotational speed equalization between the first and second vehicle axles I, II and the second and third vehicle axles II, III, respectively.

A drive element 2 provides the necessary drive power. The drive element 2 can in particular be in the form of an internal combustion engine. It is also conceivable, however, that it could be an electric motor. By means of broken lines, transmission devices 3 are represented. These are in particular driveshafts provided between the respective differential gear systems 4, 5, 6, 7, 8 and between the differential gear system 5 and the drive element 2. By means of the transmission devices 3 the rotational speed and the torque is transmitted. So long as the working machine and its drive-train 1 are moving in a forward travel direction F, the wheels R1, R1' of the first vehicle axle I cover a particular trajectory whereas the wheels R2, R2' of the second vehicle axle II cover the same stretch after a time interval. In the same way the wheels R3, R3' of the third vehicle axle III cover the same stretch after a further interval. If now one of the detection means S1, S1' of the first vehicle axle I identifies an unacceptable wheel rotational speed of one of the wheels R1, R1', then the control unit (not shown here) emits a signal to lock the differential gear system 4. A similar process takes place if for one of the wheels R2, R2' of the second vehicle axle II or one of the wheels R3, R3' of the third vehicle axle III an unacceptable value of the wheel rotational speed is detected. Correspondingly, the differential gear system 6 and/or the differential gear system 7 is locked or a signal to lock those differential gear systems 6, 7 is emitted.

So long as for both wheels R, R1', R2, R2', R3, R3' of a vehicle axle I, II, III an unacceptable wheel rotational speed value is detected at the same time, a signal to lock the differential gear system 5 and/or the differential gear system 8 is emitted and those differential gear systems 5, 8 are locked.

Since the distances between the vehicle axles I, II, III are not variable, if there is an unacceptable wheel rotational speed at one of the vehicle axles I, II, III it can be concluded that there is a traction reduction and this can be calculated if one of the later vehicle axles II, III passes over exactly the same area. Correspondingly, when this situation is reached or already shortly before, a signal to lock the differential gear system 6 or the differential gear system 7 is emitted.

Also not shown are further detection means, which for example are in the form of GPS sensors. These can be provided in addition to the existing detection means S1, S1', S2, S2', S3, S3'.

In the embodiment of the drive-train 1 illustrated here, the differential gear systems 4, 5, 6, 7, 8 are arranged centrally. This means that they are the same distance away from the left-hand and right-hand sides of the working machine. Furthermore, the second vehicle axle II is in the form of a so-termed drive-through axle. This means that the differential gear system 6, besides the rotational speed equalization at the second vehicle axle II, also ensures a drive-through to the differential gear system 8 and thereby also to the third vehicle axle III.

Figure 2:
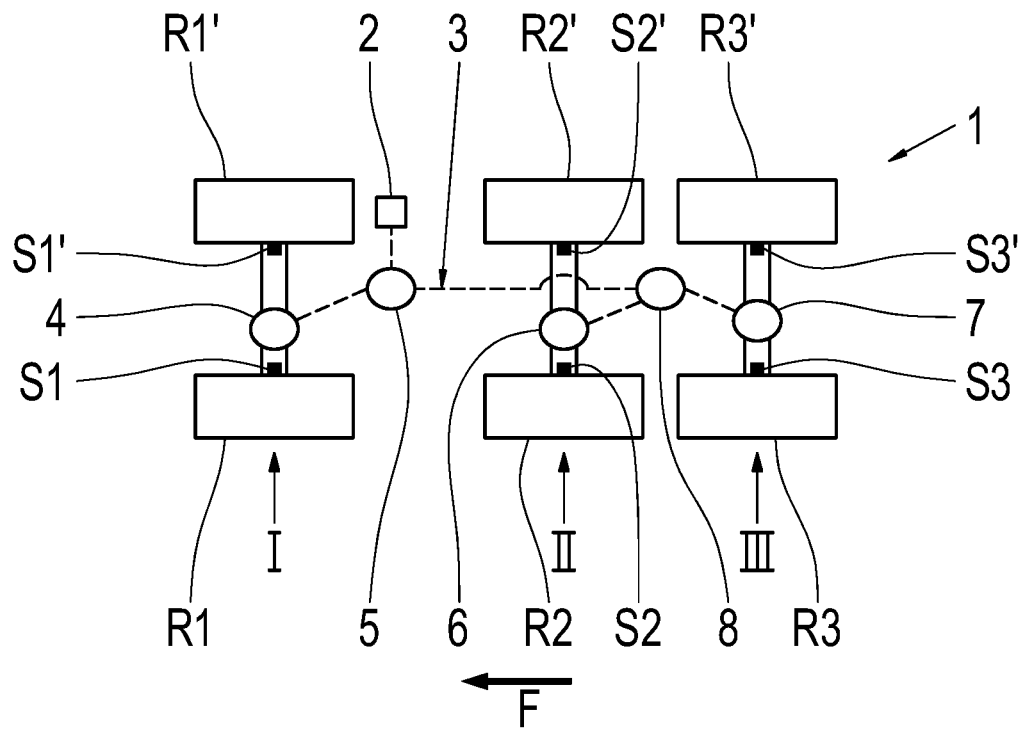
FIG. 2: A schematic representation of a second drive-train of a working machine.

FIG. 2 shows a schematic representation of a second drive-train 1. This differs from the drive-train 1 described in FIG. 1, in that the differential gear systems 4, 5, 6, 7, 8 are this time no longer arranged centrally. Rather, relative to the travel direction F the differential gear systems 4, 6 and 7 are offset parallel to and by the same distance from the differential gear systems 5 and 8. Furthermore, the differential gear system 5 is now connected to the differential gear system 8 by way of the transmission devices 3, while the differential gear system 8 is connected via the transmission devices 3 to the differential gear system 6 and the differential gear system 7. From this it follows that the second vehicle axle II is no longer a drive-through axle. However, the method according to the invention can be carried out in the same way with the existing drive-train.

Figure 3:
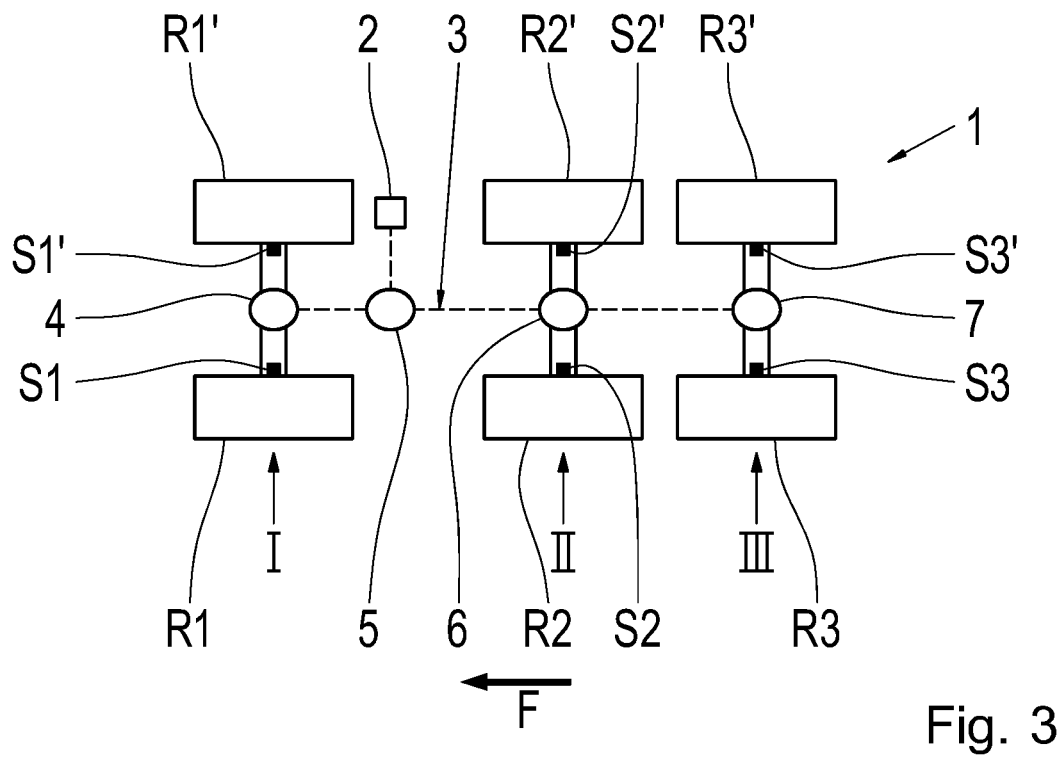
FIG. 3: A schematic representation of a third drive-train of a working machine.

FIG. 3 shows a schematic representation of an alternative design and therefore a third drive-train 1. This differs from the embodiment described in FIG. 1 in that the differential gear system 8 between the second and third vehicle axles II, III is omitted. All the other elements of the drive-train 1 and their functional interconnections are the same as in the arrangement and functional mode described in FIG. 1.

Figure 4:
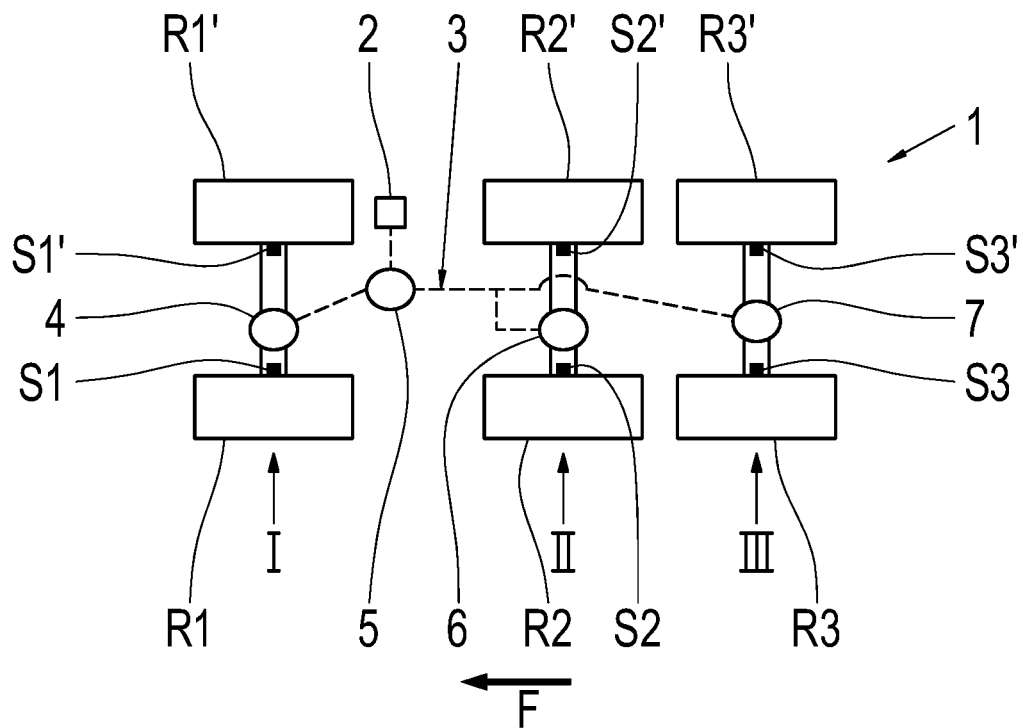
FIG. 4: A schematic representation of a fourth drive-train of a working machine.

FIG. 4 shows schematically a different version of the drive-train 1 in FIG. 2. In contrast to the embodiment shown in FIG. 1, the drive-train 1 shown in this case comprises a direct connection by way of transmission devices 3 between the differential gear system 6 and the differential gear system 5 and also the differential gear system 7 and the differential gear system 5. In all other respects the embodiments of the drive-train 1 shown in FIG. 2 and FIG. 4 are the same.

In general it should be noted that the wheels R1, R2, R3 are all arranged on the left-hand side of the working machine and the wheels R1', R2', R3' are arranged on the right-hand side of the working machine.

Figure 5:
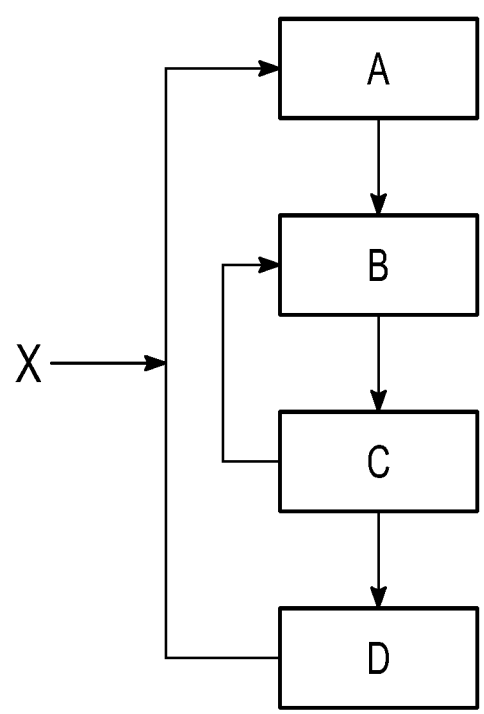
FIG. 5: A simplified flow chart of the method according to the invention.

FIG. 5 shows a greatly simplified flow chart of the method according to the invention. In a first step A, a signal to unlock the respective differential gear systems 4, 5, 6, 7, 8 is emitted. This signal can be emitted independently of any previous program or process sequence, in order to ensure that all the differential gear systems 4, 5, 6, 7, 8 are in an unlocked or open condition. Advantageously, the first process step A can also be carried out when the vehicle is started. Alternatively, it is also conceivable that the first process step A is suppressed when the vehicle is started, so that all the differential gear systems 4, 5, 6, 7, 8 remain in their last-set operating conditions.

In a second process step B, a rotational speed of at least one wheel R1, R1', R2, R2', R3, R3' is determined. This is done in particular with reference to the detection means S1, S1', S2, S2', S3, S3'.

Thereafter, in a third step C a comparison is carried out between the rotational speed determined and an acceptable rotational speed. So long as the rotational speed determined corresponds to the acceptable rotational speed, having regard to a tolerance range of the acceptable rotational speed, the process reverts from the third process step C to the second process step B. In particular, the purpose of this is that periodically the corresponding wheel rotational speed is determined again and a comparison is carried out. In this, the time interval for the repeated carrying out of the determination and comparison of the wheel rotational speed, i.e. the period length, can be fixed or varied with reference to further parameters.

So long as in the third process step C it is found that the rotational speed determined has adopted or reached an unacceptable rotational speed value, in a fourth process step D a signal to lock the differential gear system 4, 5, 6, 7, 8 concerned is generated and emitted by a control unit (not shown here). In addition the process reverts from the fourth process step D to the first process step A. Due to the reversion between the fourth and first process steps D, A, it is ensured that the differential gear system 4, 5, 6, 7, 8 concerned remains in a locked condition only for as long as is necessary for optimum driving operation.

This reversion also takes place periodically. This at the same time means that the locking condition of the differential gear system 4, 5, 6, 7, 8 concerned produced in the fourth process step D persists during a certain time interval before a signal to unlock the differential gear system 4, 5, 6, 7, 8 is emitted in the first process step A. The period length after which the change from the fourth process step D to the first process step A takes place, can be influenced by driving dynamics parameters X. Thus, such driving dynamics parameters X can in particular contribute toward shortening a specified period length. In particular this happens when the working machine begins driving round a curve or when a limit value for a curve radius is reached or exceeded, at which limit a locked differential gear system 4, 5, 6, 7, 8 has a disadvantageous influence on the driving dynamics of the working machine.

The sequence for the method according to the invention described in FIG. 5 pictures the determination of a wheel rotational speed, and if the wheel rotational speed is unacceptable, a differential gear system 4, 5, 6, 7, 8 concerned is locked for only one of the wheels R1, R1', R2, R2', R3, R3' of the working machine. Correspondingly, the sequence shown in FIG. 5 can be scaled as desired and extended to other wheels R1, R1', R2, R2', R3, R3' of the working machine. In particular, the process sequence shown can be extended in such manner that with a plurality of locked differential gear systems 4, 5, 6, 7, 8 a weighting can be applied, to indicate for which of these differential gear systems 4, 5, 6, 7, 8 an unlocking signal should be emitted as a priority. Correspondingly, it is also conceivable that this information should influence the driving dynamics parameters X in relation to the period length of the reversion from the fourth process step D to the first process step A.

INDEXES

1 Drive-train
2 Drive element
3 Transmission device
4 Differential gear system
5 Differential gear system
6 Differential gear system
7 Differential gear system
8 Differential gear system
I, II, III Vehicle axle
R1, R1' Wheel
R2, R2' Wheel
R3, R3' Wheel
S1, S1' Detection means
S2, S2' Detection means
S3, S3' Detection means
A, B, C, D Process step
X Driving dynamics parameter

The invention claimed is:

1. A method for controlling a driving dynamics function of a working machine with at least two vehicle axles, the method comprising:
   detecting and sending a current actual wheel rotational speed of at least one wheel to a control unit for comparison with an acceptable wheel rotational speed of the same wheel, and
   calculating a wheel slip from such comparison, the control unit emits a control signal to lock at least one differential gear system when the wheel slip has an unacceptable value, for the differential gear system concerned an unlocking control signal is emitted periodically and the wheel rotational speeds are compared afresh, and again emitting a control signal to lock the differential gear system concerned when the value of the wheel slip is still unacceptable, and with reference to detection means detecting a trajectory, along which the value of the wheel slip of the at least one wheel has been unacceptable, and
   besides the trajectory itself, determining a position of the trajectory in a predictive manner, before a further wheel covers the trajectory, emitting a control signal to lock the differential gear system concerned for at least one further differential gear system.

2. The method according to claim 1, further comprising periodically emitting, for at least the further differential gear system, an unlocking control signal and carrying out another comparison of the wheel rotational speeds, and again emitting a control signal to lock the differential gear system concerned when the value of the wheel slip is still unacceptable.

3. The method according to claim 2, further comprising adapting a value of a closing duration of the at least one locked differential gear system having regard to further driving dynamics parameters, and the value of the closing duration resulting from a period length.

4. A method for controlling a driving dynamics function of a working machine with at least two vehicle axles, the method comprising:
   detecting and sending a current actual wheel rotational speed of at least one wheel to a control unit for comparison with an acceptable wheel rotational speed of the same wheel, and
   calculating a wheel slip from such comparison, the control unit emits a control signal to lock at least one differential gear system when the wheel slip has an unacceptable value, for the differential gear system concerned an unlocking control signal is emitted periodically and the wheel rotational speeds are compared afresh, and again emitting a control signal to lock the differential gear system concerned when the value of the wheel slip is still unacceptable, and with reference to detection means a trajectory is detected, along which the value of the wheel slip of the at least one wheel has been unacceptable;

besides the trajectory itself, its position is determined, and in a predictive manner, before a further wheel covers the trajectory, emitting a control signal to lock the differential gear system concerned for at least one further differential gear system; and as a priority for the differential gear system concerned, emitting an unlocking control signal and determining the wheel slip, at which unlocking would with high probability give expectation of an acceptable wheel slip value, and again emitting a control signal to unlock the differential gear system when the value of the wheel slip is still unacceptable.

5. The method according to claim 4, further comprising, when an unacceptable wheel slip value is previously determined, deferring the periodic emission of the control signal to unlock the remaining differential gear systems.

6. The method according to claim 1, wherein a wheel rotational speed of at least one further wheel is used by the detection means.

7. The method according to claim 1, further comprising a signal for the determination of position data is used by the detection means.

8. A working machine comprising:
a drive-train with a drive element,
at least one differential gear system that is lockable,
at least two vehicle axles, and
at least one wheel being fitted on each vehicle axle;
detection means; and
a control unit designed for carry out the method according to claim 1.

9. A computer program product with a program code for carrying out the method according to claim 1 when the program code is run on a computer.

10. A method for controlling a driving dynamics function of a working machine having at least two vehicle axles, the method comprising:
detecting and sending, to a control unit, a current actual wheel rotational speed of at least one wheel,
comparing, with the control unit, the current actual wheel rotational speed of the wheel to an acceptable wheel rotational speed of that wheel,
calculating a wheel slip from the comparison,
emitting, via the control unit, a control signal to lock at least one differential gear system when the wheel slip has an unacceptable value,
periodically emitted an unlocking control signal, for the differential gear system concerned,
again comparing the wheel rotational speeds and, when the value of the wheel slip is still unacceptable, again emitting a control signal to lock the differential gear system concerned,
detecting a trajectory, via detection means, along which a value of the wheel slip of the at least one wheel is unacceptable, and
besides the trajectory itself, determining a position of the trajectory in a predictive manner, before a further wheel covers the trajectory, emitting a further control signal to lock the differential gear system concerned for at least one further differential gear system.

\* \* \* \* \*